US009341051B2

(12) United States Patent
Burkus et al.

(10) Patent No.: US 9,341,051 B2
(45) Date of Patent: May 17, 2016

(54) METHODS FOR ENHANCING EFFICIENCY OF BITUMEN EXTRACTION FROM OIL SANDS USING LIPIDS AND LIPID BY-PRODUCTS AS PROCESS ADDITIVES

(71) Applicant: Apex Engineering Inc., Edmonton (CA)

(72) Inventors: Zvonko Burkus, Edmonton (CA); Baki Ozum, Edmonton (CA)

(73) Assignee: APEX ENGINEERING INC., Edmonton, CA (US)

( * ) Notice: Subject to any disclaimer, the term of this patent is extended or adjusted under 35 U.S.C. 154(b) by 0 days.

(21) Appl. No.: 14/644,356

(22) Filed: Mar. 11, 2015

(65) Prior Publication Data
US 2015/0184501 A1    Jul. 2, 2015

Related U.S. Application Data

(63) Continuation of application No. 12/246,023, filed on Oct. 6, 2008, now abandoned.

(60) Provisional application No. 61/028,365, filed on Feb. 13, 2008, provisional application No. 60/977,560, filed on Oct. 4, 2007.

(51) Int. Cl.
*E21B 43/24*      (2006.01)
*C10G 1/04*      (2006.01)
*C09K 8/592*      (2006.01)

(52) U.S. Cl.
CPC .............. *E21B 43/2408* (2013.01); *C09K 8/592* (2013.01); *C10G 1/047* (2013.01); *Y02E 50/13* (2013.01)

(58) Field of Classification Search
CPC ..... C10G 1/047; E21B 43/24; E21B 43/2406; E21B 43/2408
See application file for complete search history.

(56) References Cited

U.S. PATENT DOCUMENTS

| | | | | |
|---|---|---|---|---|
| 3,874,452 A * | 4/1975 | Allen | ..................... | E21B 43/243 166/260 |
| 5,551,956 A * | 9/1996 | Moriyama | .............. | C10L 1/328 44/301 |
| 6,279,653 B1 * | 8/2001 | Wegener | ................ | E21B 43/25 166/177.2 |
| 6,536,523 B1 * | 3/2003 | Kresnyak | .............. | E01D 1/0047 166/266 |
| 2003/0188864 A1 * | 10/2003 | Boudreau | ................ | C09K 3/32 166/270.1 |
| 2008/0060257 A1 * | 3/2008 | Duyvesteyn | ............. | C09K 8/58 44/300 |

OTHER PUBLICATIONS

Babadagli et al., "BioDiesel as Additive in High Pressure and Temperature Steam Recovery of Heavy Oil and Bitumen"; Oil and Gas Science and Technology, vol. 67 (2012), No. 3, pp. 413-421.
Arguelles-Vivas et al., "High Temperature Density, Viscosity, and Interfacial Tension Measurements of Bitumen-Pentane-Biodiesel and Process Water Mixtures"; American Chemical Society, Journal of Chemical Engineering Data, Sep. 25, 2012, 57, pp. 2878-2889.
Ozum, Baki, "Biodiesel as Surfactant Additive in Steam Assisted Bitumen Production Processes"; Presentation to San Joaquin SPE Sub-Surface Study Group, Bakersfield, CA, Nov. 13, 2013.
Naderi,et al., "Effect of bitumen viscosity and bitumen-water interfacial tension on steam assisted bitumen recovery process efficiency"; Journal of Petroleum Science and Engineering (2015); http://dx.doi.org/10.1016/j.petrol.2015.04.001.
Ozum, Baki, "Use of Lipids and Lipid By-products as Surfactants for In-Situ Bitumen Recovery"; Presentation to EnCana Corporation, Calgary, Alberta, Nov. 13, 2008.
Little, et al., "A Study on Energy Transfer during SAGD and Its Effects on Flow Characteristics"; Presentation to the SPE Heavy Oil Conference Canada, Calgary, Alberta, Jun. 11-13, 2013 (SPE 165533).

* cited by examiner

*Primary Examiner* — Michelle Stein
(74) *Attorney, Agent, or Firm* — Donald V. Tomkins

(57) ABSTRACT

In a method for enhancing the efficiency of separation of bitumen from oil sands ore, lipids, lipid by-products, and lipid derivatives are used as process additives for ore-water slurry-based bitumen extraction processes or in situ bitumen recovery processes. These additives act as surfactants reducing surface and interfacial tensions, thus promoting breakdown the oil sands ore structure and resultant liberation of bitumen from the ore. Lipid treatment does not deleteriously affect release water chemistry in bitumen recovery processes, and it does not appreciably affect the fuel value of recovered bitumen. Lipids which may be effectively used as additives include biodiesel, tall oil fatty acids, monoglycerides, vegetable oil, and soap water, and combinations thereof. Lipids may also be used as process additives to enhance the efficiency of clean-up of hydrocarbon-contaminated soils, in the production of bitumen-water or oil-water emulsions, and to enhance the transportability of emulsions such as in pipelines.

12 Claims, 6 Drawing Sheets

FIGURE 1 - Proximate composition of tested ores

| Ore | Bitumen % | Moisture % | Solids % | Sand % | Fines in ore % | Fines in Solids % |
|---|---|---|---|---|---|---|
| ARC 0807 | 14.9 | 0.9 | 83.2 | 80.5 | 2.8 | 3.3 |
| ARC 0907 | 8.5 | 4.9 | 86.2 | 71.1 | 15.1 | 17.5 |
| ARC 1107 | 8.1 | 5.1 | 86.5 | 69.9 | 16.6 | 19.2 |
| ARC 0108 | 8.8 | 5.5 | 85.0 | 61.9 | 23.2 | 27.3 |
| ARC 0308 | 7.6 | 5.0 | 86.6 | 62.1 | 25.3 | 29.2 |

Figure 2A - Processing of the ARC ores after addition of lipids, extraction at 40°C or at 50°C

| Ore & Treatment | Lipid in ore mg/kg | Temperature °C | Froth yield g | Bitumen yield g | Bitumen recovery % | Corrected recovery* % | Bitumen in froth % | Solids in froth % | Water in froth by difference % |
|---|---|---|---|---|---|---|---|---|---|
| ARC0807-1 Blank | - | 40 | 101.0 | 31.7 | 70.9 | | 31.4 | 49.5 | 19.1 |
| ARC0807-2 Blank | - | 40 | 118.7 | 36.4 | 81.3 | 81.3 | 30.6 | 49.9 | 19.5 |
| ARC0807-5 canola oil | 1.50% | 40 | 126.1 | 38.0 | 84.9 | 74.9 | 30.1 | 52.7 | 17.2 |
| ARC0907-1 Blank 40C | - | 40 | 83.5 | 17.5 | 68.6 | 68.6 | 21.0 | 25.2 | 53.8 |
| ARC0907-2 Blank 40C | - | 40 | 82.5 | 17.7 | 69.4 | 69.4 | 21.5 | 24.4 | 54.2 |
| ARC0907-5 Canola oil | 1700 | 40 | 92.5 | 19.0 | 74.5 | 72.4 | 20.6 | 25.7 | 53.8 |
| ARC0907-6 Raw canola oil | 1700 | 40 | 92.1 | 19.8 | 77.3 | 75.2 | 21.4 | 25.0 | 53.6 |
| ARC0907-11 Soap stock 40C | 250 | 40 | 97.9 | 19.7 | 77.0 | 76.7 | 20.1 | 26.9 | 53.0 |
| ARC0907-12 Green paste | 670 | 40 | 94.2 | 18.9 | 73.8 | 73 | 20.0 | 25.7 | 54.3 |
| ARC0907-13 Blank 40C | - | 40 | 75.1 | 16.5 | 64.6 | 64.6 | 22.0 | 22.0 | 56.0 |
| ARC0907-14 Blank 40C | - | 40 | 88.9 | 18.5 | 72.2 | 72.2 | 20.8 | 25.7 | 53.5 |
| ARC0907-25 Soap water 50C | 250 | 50 | 103.7 | 21.2 | 82.8 | 82.5 | 20.4 | 27.8 | 51.8 |
| ARC0907-26 Soap water 50C | 200 | 50 | 101.8 | 20.4 | 80.0 | 79.8 | 20.1 | 26.6 | 53.3 |
| ARC0907-31 Blank@50C | - | 50 | 99.0 | 18.8 | 73.6 | 73.6 | 19.0 | 27.4 | 53.6 |
| ARC0907-32 Blank@50C | - | 50 | 107.3 | 19.5 | 76.3 | 76.3 | 18.2 | 27.9 | 53.9 |
| ARC0907-33 Oil+Soap water | 1270 | 50 | 105.6 | 20.5 | 80.2 | 78.7 | 19.4 | 29.3 | 51.3 |
| ARC0907-34 Oil+Soap water | 1000 | 50 | 102.5 | 19.7 | 77.2 | 76 | 19.2 | 29.6 | 51.1 |
| ARC1107-1 BD | 1667 | 40 | 95.8 | 19.7 | 80.7 | 78.7 | 20.6 | 28.2 | 51.3 |
| ARC1107-2 BD | 1667 | 40 | 98.6 | 20.6 | 84.3 | 82.3 | 20.9 | 26.8 | 50.4 |
| ARC1107-3 Blank | - | 40 | 87.2 | 17.7 | 72.5 | 72.5 | 20.3 | 25.9 | 53.8 |
| ARC1107-4 Blank | - | 40 | 91.6 | 18.2 | 74.6 | 74.6 | 19.9 | 25.4 | 54.7 |
| ARC1107-5 BD | 867 | 40 | 91.9 | 20.4 | 83.6 | 82.5 | 22.2 | 25.8 | 52.0 |
| ARC1107-6 BD | 867 | 40 | 94.0 | 20.0 | 81.8 | 80.8 | 21.2 | 25.6 | 53.1 |
| ARC1107-7 BD | 433 | 40 | 96.1 | 19.9 | 81.7 | 81.2 | 20.7 | 26.7 | 52.6 |
| ARC1107-8 BD | 433 | 40 | 100.8 | 20.0 | 81.9 | 81.4 | 19.8 | 28.5 | 51.7 |
| ARC1107-9 BD | 3333 | 40 | 89.7 | 20.6 | 84.4 | 80.3 | 22.9 | 26.5 | 50.6 |
| ARC1107-10 BD | 3333 | 40 | 94.3 | 20.3 | 83.1 | 79.0 | 21.5 | 27.1 | 51.4 |
| ARC1107-11 BD+CaO | 400 | 40 | 98.3 | 18.6 | 76.2 | 75.7 | 18.9 | 28.0 | 53.1 |
| ARC1107-12 BD+CaO | 400 | 40 | 104.5 | 18.9 | 77.3 | 76.8 | 18.1 | 29.5 | 52.4 |
| ARC1107-13 BD+soap 0.5ml | 525 | 40 | 102.7 | 18.9 | 77.4 | 76.7 | 18.4 | 28.3 | 53.3 |
| ARC1107-14 BD+soap 0.5ml | 525 | 40 | 105.3 | 19.3 | 79.0 | 78.4 | 18.3 | 29.7 | 52.0 |
| ARC1107-21 Blank | 400 | 40 | 88.7 | 16.6 | 68.0 | 68.0 | 18.7 | 24.9 | 56.4 |
| ARC1107-22 Blank | 400 | 40 | 91.0 | 16.9 | 69.4 | 69.4 | 18.5 | 25.7 | 55.7 |
| ARC1107-23 BD 36°C | 1000 | 35 | 94.56 | 17.7 | 72.5 | 71.2 | 18.7 | 25.9 | 55.4 |
| ARC1107-24 BD 36°C | 1000 | 35 | 89.92 | 17.9 | 73.5 | 72.3 | 20.0 | 24.6 | 55.5 |

*Corrected recovery is calculated assuming complete lipid recovery with froth and deducts lipid from the bitumen yield.

Figure 2B - Processing of the ARC ores after addition of lipids, extraction at 40°C or at 50°C

| Ore & Treatment | Lipid in ore mg/kg | Temperature °C | Froth yield g | Bitumen yield g | Bitumen recovery % | Corrected recovery* % | Bitumen in froth % | Solids in froth % | Water in froth by difference % |
|---|---|---|---|---|---|---|---|---|---|
| ARC0108-1 Blank | - | 40 | 82.8 | 22.0 | 83.0 | 83.0 | 26.6 | 22.4 | 51.0 |
| ARC0108-2 Blank | - | 40 | 96.5 | 21.0 | 79.2 | 79.2 | 21.8 | 21.7 | 56.5 |
| ARC0108-3 BD | 400 | 40 | 93.0 | 22.6 | 85.3 | 84.8 | 24.3 | 22.0 | 53.7 |
| ARC0108-4 BD | 400 | 40 | 97.4 | 22.6 | 85.2 | 84.7 | 23.2 | 22.5 | 54.3 |
| ARC0108-5 TOFA | 1000 | 40 | 68.2 | 20.8 | 78.3 | 77.2 | 30.5 | 21.0 | 48.5 |
| ARC0108-6 TOFA | 1000 | 40 | 75.5 | 22.4 | 84.5 | 83.4 | 29.7 | 20.8 | 49.5 |
| ARC0108-7 TOFA | 500 | 40 | 75.5 | 21.9 | 82.5 | 82.0 | 29.0 | 21.8 | 49.2 |
| ARC0108-8 TOFA | 500 | 40 | 82.0 | 22.5 | 84.8 | 84.2 | 27.4 | 21.1 | 51.5 |
| ARC0108-9 TOFA | 267 | 40 | 82.3 | 22.7 | 85.7 | 85.4 | 27.6 | 21.2 | 51.2 |
| ARC0108-10 TOFA | 267 | 40 | 83.5 | 22.1 | 83.2 | 82.9 | 26.4 | 21.8 | 51.8 |
| ARC0108-11 TOFA+SW | 267 | 40 | 87.5 | 21.7 | 81.8 | 81.5 | 24.8 | 21.2 | 54.0 |
| ARC0108-12 TOFA+SW | 267 | 40 | 85.9 | 23.2 | 87.4 | 87.1 | 27.0 | 22.1 | 50.9 |
| ARC0108-14 Blank | - | 40 | 89.2 | 20.5 | 77.2 | 77.2 | 23.0 | 23.3 | 53.7 |
| ARC0108-15 Blank | - | 40 | 97.0 | 21.3 | 80.3 | 80.3 | 21.9 | 21.9 | 56.3 |
| ARC0108-16 MG | 60 | 40 | 90.3 | 18.0 | 68.0 | 67.9 | 20.0 | 17.7 | 62.3 |
| ARC0108-17 MG | 31 | 40 | 106.6 | 20.4 | 76.8 | 76.8 | 19.1 | 19.2 | 61.7 |
| ARC0108-18 BD | 300 | 40 | 101.2 | 21.2 | 79.7 | 79.4 | 20.9 | 22.7 | 56.4 |
| ARC0108-19 BD | 300 | 40 | 98.1 | 22.9 | 86.5 | 86.1 | 23.4 | 24.3 | 52.3 |
| ARC0108-20 BD+MG | 330 | 40 | 96.3 | 21.2 | 79.9 | 79.5 | 22.0 | 22.7 | 55.3 |
| ARC0108-21 BD+MG | 350 | 40 | 98.4 | 22.3 | 83.9 | 83.5 | 22.6 | 22.8 | 54.6 |
| ARC0108-22 BD+MG | 500 | 40 | 98.9 | 21.6 | 81.2 | 80.7 | 21.8 | 23.5 | 54.7 |
| ARC0108-23 BD | 500 | 40 | 112.6 | 21.9 | 82.4 | 81.8 | 19.4 | 23.3 | 57.3 |
| ARC0108-24 BD+MG | 530 | 40 | 97.1 | 21.9 | 82.4 | 81.6 | 22.5 | 22.7 | 54.8 |
| ARC0108-25 BD+MG | 530 | 40 | 103.4 | 21.7 | 81.6 | 81.0 | 20.9 | 22.6 | 56.5 |
| ARC0108-26 BD (dispersed) | 500 | 40 | 99.0 | 21.7 | 81.7 | 81.1 | 21.5 | 24.3 | 54.2 |
| ARC0108-27 BD (dispersed) | 500 | 40 | 101.1 | 22.1 | 83.3 | 82.7 | 21.5 | 23.1 | 55.4 |
| ARC0108-28 BD+SW | 750 | 40 | 94.2 | 21.9 | 82.7 | 82.1 | 23.3 | 23.2 | 53.5 |
| ARC0108-29 BD+SW | 750 | 40 | 94.9 | 21.9 | 82.6 | 82.0 | 23.1 | 23.4 | 53.5 |
| ARC0108-30 BD+SW | 325 | 40 | 95.3 | 20.8 | 78.5 | 78.2 | 21.9 | 22.8 | 55.3 |
| ARC0108-31 BD+SW | 325 | 40 | 103.1 | 22.8 | 86.0 | 85.7 | 22.1 | 23.8 | 54.1 |

Figure 3A - Analysis of tailing water

| Sample ID | Treatment | pH | Conductiv (mS) | Alkalinity (mg CaCO3/L) | | | Cations (mg/L) | | | | Anions (mg/L) | |
|---|---|---|---|---|---|---|---|---|---|---|---|---|
| | | | | Total | CO3 | HCO3 | Na | K | Mg | Ca | Cl | SO4 |
| ARC0807-1 | Blank | 8.42 | 1.578 | 404 | 12 | 392 | 427 | 19 | 5 | 5 | 190 | 116 |
| ARC0807-2 | Blank | 8.48 | 1.62 | 415 | 14 | 401 | 442 | 20 | 4 | 4 | 196 | 117 |
| ARC0807-5 | Canola oil | 7.26 | 1.579 | 393 | 0 | 393 | 460 | 22 | 4 | 5 | 187 | 114 |
| ARC0907-1 | Blank 40C | - | - | - | - | - | - | - | - | - | - | - |
| ARC0907-2 | Blank 40C | 8.30 | 1.616 | 385 | 0 | 385 | 459 | 24 | 13 | 14 | 209 | 219 |
| ARC0907-5 | canola oil-old | 8.29 | 1.638 | 342 | 0 | 342 | 413 | 23 | 14 | 13 | 181 | 207 |
| ARC0907-6 | raw canola oil | 8.29 | 1.630 | 345 | 0 | 345 | 398 | 23 | 12 | 16 | 181 | 204 |
| ARC0907-11 | Soap stock 40C | 8.21 | 1.706 | 364 | 0 | 364 | 419 | 24 | 14 | 26 | 189 | 216 |
| ARC0907-12 | Green paste | 8.06 | 1.708 | 365 | 0 | 365 | 422 | 23 | 14 | 26 | 187 | 214 |
| ARC0907-13 | Blank 40C | 8.27 | 1.616 | 338 | 0 | 338 | 434 | 23 | 13 | 10 | 174 | 205 |
| ARC0907-14 | Blank 40C | - | - | - | - | - | - | - | - | - | - | - |
| ARC0907-25 | Soap water 50C | 8.09 | 1.658 | 0 | 316 | 316 | 360 | 22 | 9 | 24 | 196 | 268 |
| ARC0907-26 | Soap water 50C | 8.38 | 1.673 | 2 | 320 | 316 | 351 | 22 | 9 | 25 | 204 | 279 |
| ARC0907-31 | Blank@50C | 8.37 | 1.574 | 2 | 282 | 278 | 398 | 21 | 8 | 12 | 192 | 275 |
| ARC0907-32 | Blank@50C | 8.35 | 1.621 | 0 | 295 | 295 | 412 | 22 | 8 | 13 | 199 | 276 |
| ARC0907-33 | Oil+Soap water 50C | 8.15 | 1.669 | 0 | 322 | 322 | 432 | 22 | 9 | 26 | 197 | 283 |
| ARC0907-34 | Oil+Soap water 50C | 8.34 | 1.676 | 1 | 320 | 318 | 451 | 22 | 9 | 13 | 200 | 281 |
| ARC1107-1 | BD 0.5g | 8.61 | 1.345 | 270 | 10 | 260 | 353 | 22 | 11 | 17 | 171 | 132 |
| ARC1107-2 | BD 0.5g | 8.61 | 1.385 | 277 | 10 | 267 | 335 | 24 | 11 | 16 | 185 | 132 |
| ARC1107-3 | Blank 40C | 8.6 | 1.342 | 278 | 10 | 268 | 369 | 22 | 11 | 17 | 170 | 120 |
| ARC1107-4 | Blank 40C | 8.61 | 1.373 | 283 | 10 | 273 | 356 | 23 | 11 | 17 | 180 | 125 |
| ARC1107-5 | BD 0.26g | 8.53 | 1.374 | 291 | 8 | 283 | 353 | 23 | 11 | 19 | 176 | 123 |
| ARC1107-6 | BD 0.26g | 8.51 | 1.417 | 298 | 8 | 290 | 367 | 25 | 12 | 17 | 183 | 126 |
| ARC1107-7 | BD 0.13g | 8.54 | 1.397 | 295 | 8 | 287 | 363 | 24 | 11 | 19 | 182 | 123 |
| ARC1107-8 | BD 0.13g | 8.57 | 1.405 | 290 | 8 | 282 | 335 | 26 | 11 | 20 | 189 | 128 |
| ARC1107-9 | BD 1.0g | 8.49 | 1.356 | 291 | 8 | 283 | 338 | 22 | 12 | 20 | 174 | 121 |
| ARC1107-10 | BD 1.0g | 8.46 | 1.401 | 298 | 8 | 290 | 354 | 23 | 11 | 18 | 183 | 126 |
| ARC1107-11 | BD+CaO | 8.29 | 1.365 | 274 | 0 | 274 | 360 | 22 | 9 | 7 | 184 | 142 |
| ARC1107-12 | BD+CaO | 8.36 | 1.369 | 275 | 3 | 272 | 366 | 22 | 8 | 5 | 192 | 134 |
| ARC1107-13 | BD+soap | 8.20 | 1.433 | 307 | 0 | 307 | 349 | 23 | 10 | 21 | 200 | 139 |
| ARC1107-14 | BD+soap | 8.22 | 1.421 | 308 | 0 | 308 | 380 | 22 | 10 | 22 | 187 | 130 |
| ARC1107-21 | Blank | 8.33 | 1.371 | 280 | 2 | 278 | 375 | 21 | 8 | 7 | 193 | 139 |
| ARC1107-22 | Blank | 8.32 | 1.392 | 286 | 2 | 284 | 385 | 21 | 8 | 9 | 196 | 141 |
| ARC1107-23 | BD 36 C | 8.38 | 1.379 | 291 | 5 | 286 | 324 | 22 | 10 | 15 | 200 | 147 |
| ARC1107-24 | BD 36 C | 8.38 | 1.403 | 291 | 4 | 287 | 331 | 22 | 10 | 16 | 211 | 153 |

Figure 3B - Analysis of tailing water

| Sample ID | Treatment | pH | Conductivity (mS) | Alkalinity (mg CaCO3/L) | | | Cations (mg/L) | | | | Anions (mg/L) | |
|---|---|---|---|---|---|---|---|---|---|---|---|---|
| | | | | Total | CO3 | HCO3 | Na | K | Mg | Ca | Cl | SO4 |
| ARC0108-1 | Blank 40C | 8.46 | 3.68 | 290 | 6 | 284 | 813 | 25 | 6 | 6 | 602 | 434 |
| ARC0108-2 | Blank 40C | 8.43 | 3.91 | 285 | 6 | 279 | 844 | 26 | 7 | 8 | 650 | 499 |
| ARC0108-3 | BD 0.12g | 8.47 | 3.860 | 290 | 6 | 284 | 836 | 25 | 6 | 10 | 661 | 485 |
| ARC0108-4 | BD 0.12g | 8.44 | 3.860 | 278 | 5 | 273 | 822 | 27 | 8 | 19 | 655 | 507 |
| ARC0108-5 | TOFA 0.30g | 8.39 | 3.690 | 301 | 4 | 297 | 797 | 25 | 6 | 7 | 642 | 439 |
| ARC0108-6 | TOFA 0.30g | 8.31 | 3.840 | 302 | 0 | 302 | 825 | 25 | 6 | 11 | 661 | 479 |
| ARC0108-7 | TOFA 0.15g | 8.34 | 3.700 | 297 | 2 | 295 | 796 | 24 | 6 | 8 | 635 | 463 |
| ARC0108-8 | TOFA 0.15g | 8.42 | 3.790 | 295 | 5 | 289 | 812 | 25 | 6 | 8 | 658 | 480 |
| ARC0108-9 | TOFA 0.08g | 8.28 | 3.740 | 289 | 0 | 289 | 808 | 25 | 6 | 10 | 622 | 478 |
| ARC0108-10 | TOFA 0.08g | 8.37 | 3.830 | 295 | 2 | 293 | 828 | 26 | 7 | 9 | 631 | 482 |
| ARC0108-11 | TOFA 0.08g +SW | 8.18 | 3.870 | 311 | 0 | 311 | 832 | 26 | 7 | 8 | 643 | 493 |
| ARC0108-12 | TOFA 0.08g +SW | 8.26 | 3.800 | 320 | 0 | 320 | 820 | 25 | 6 | 11 | 633 | 458 |
| APW-Mar 2008 | Art. Proc. water | 8.72 | 1.265 | 368 | 24 | 344 | 258 | 21 | 10 | 6 | 196 | 8 |
| ARC0108-14 | Blank 40C | 8.44 | 3.610 | 278 | 6 | 272 | 725 | 25 | 10 | 10 | 644 | 476 |
| ARC0108-15 | Blank 40C | 8.46 | 3.760 | 292 | 8 | 284 | 801 | 26 | 9 | 5 | 709 | 503 |
| ARC0108-16 MG | MG 0.018g | 8.4 | 3.810 | 285 | 5 | 280 | 789 | 26 | 10 | 6 | 728 | 536 |
| ARC0108-17 MG | MG 0.009g | 8.33 | 3.980 | 282 | 1 | 281 | 839 | 28 | 11 | 6 | 738 | 585 |
| ARC0108-18 BD | BD 0.09g | 8.32 | 3.720 | 273 | 0 | 273 | 768 | 26 | 11 | 6 | 700 | 538 |
| ARC0108-19 BD | BD 0.09g | 8.31 | 3.650 | 285 | 0 | 285 | 773 | 26 | 10 | 5 | 674 | 494 |
| ARC0108-20 BD+MG | BD+MG 0.10g | 8.31 | 3.740 | 293 | 0 | 293 | 776 | 26 | 10 | 6 | 715 | 519 |
| ARC0108-21 BD+MG | BD+MG 0.11g | 8.32 | 3.800 | 299 | 0 | 299 | 772 | 26 | 10 | 6 | 731 | 516 |
| ARC0108-22 BD | BD 0.15g | 8.4 | 3.770 | 274 | 4 | 270 | 775 | 26 | 11 | 5 | 701 | 552 |
| ARC0108-23 BD | BD 0.15g | 8.43 | 3.800 | 284 | 6 | 278 | 791 | 27 | 11 | 7 | 730 | 548 |
| ARC0108-24 BD+MG | BD+MG 0.159g | 8.46 | 3.800 | 296 | 8 | 288 | 778 | 26 | 10 | 7 | 740 | 528 |
| ARC0108-25 BD+MG | BD+MG 0.159g | 8.46 | 3.840 | 292 | 8 | 284 | 778 | 26 | 10 | 7 | 758 | 547 |
| ARC0108-26 BD disp. | BD 0.15g | 8.37 | 3.590 | 271 | 3 | 268 | 722 | 26 | 11 | 6 | 680 | 550 |
| ARC0108-27 BD disp. | BD 0.15g | 8.39 | 3.800 | 308 | 4 | 304 | 779 | 26 | 10 | 6 | 747 | 522 |
| ARC0108-28 BD+SW | BD+SW 0.225g | 8.14 | 3.700 | 328 | 0 | 328 | 758 | 25 | 9 | 5 | 696 | 477 |
| ARC0108-29 BD+SW | BD+SW 0.225g | 8.04 | 3.830 | 337 | 0 | 337 | 749 | 25 | 9 | 7 | 742 | 466 |
| ARC0108-30 BD+SW | BD+SW 0.0975g | 8.15 | 3.790 | 315 | 0 | 315 | 772 | 26 | 10 | 6 | 753 | 526 |
| ARC0108-31 BD+SW | BD+SW 0.0975g | 8.16 | 3.770 | 315 | 0 | 315 | 764 | 26 | 10 | 6 | 743 | 521 |

Figure 4 - The influence of TOFA on recovery of solids in froth. All weights in grams

| Sample ID | Treatment | Thimble + solids | Empty thimble | SOLIDS g | Tray+dry sand | Tray g | SAND g | Sand in solids % | Fines in solids % | Fines g |
|---|---|---|---|---|---|---|---|---|---|---|
| ARC0308 13 | Blank | 41.05 | 9.08 | 31.97 | 25.27 | 1.55 | 23.72 | 74.2 | 25.8 | 8.25 |
| ARC0308 14 | Blank | 43.26 | 8.43 | 34.83 | 27.95 | 1.55 | 26.4 | 75.8 | 24.2 | 8.43 |
| ARC0308 17 | TOFA 0.15g | 33.51 | 8.85 | 24.66 | 20.52 | 1.55 | 18.97 | 76.9 | 23.1 | 5.69 |
| ARC0308 18 | TOFA 0.15g | 35.72 | 9.76 | 25.96 | 21.65 | 1.56 | 20.09 | 77.4 | 22.6 | 5.87 |

METHODS FOR ENHANCING EFFICIENCY OF BITUMEN EXTRACTION FROM OIL SANDS USING LIPIDS AND LIPID BY-PRODUCTS AS PROCESS ADDITIVES

FIELD OF THE INVENTION

The present invention relates to methods for increasing the efficiency of bitumen recovery from oil sands using water-slurry-based and in situ extraction processes. More particularly, the invention relates to the use of lipids and lipid by-products to enhance separation and recovery of bitumen from the oil-and-sand matrix.

BACKGROUND OF THE INVENTION

The oil sands deposits of northern Alberta, Canada are estimated to contain about 142 billion cubic meters (or 890 billion barrels) of bitumen, constituting the largest oil sands deposit in the world. In the Athabasca region of Alberta, oil sands deposits are typically composed of about 12% bitumen (by weight), 82% to 85% mineral matter (solids), and 3% to 6% water. The fraction of solids smaller than 45 micron size (silt and clay) is referred to as fines. The clay fraction of the fines plays an important role in both extraction of bitumen and disposal of oil sands tailings. Since the 1960s, bitumen recovered from northern Alberta oil sands deposits has been upgraded to make synthetic crude oil at production rates as high as one million barrels per day.

Bitumen is commonly recovered from the surface-mined oil sands ore using water-slurry-based extraction processes. Liberated bitumen has to be recovered from the oil sands ore-water slurry by some kind of separation method based on density differences. Bitumen density is very close to the density of water; as a result, bitumen has to become attached to air bubbles to facilitate its recovery from the slurry system by flotation. Clay particles attached to bitumen droplets prevent interaction between bitumen and air bubbles. Attachment of clay particles to bitumen is promoted by the calcium, $Ca^{2+}$ and magnesium, $Mg^{2+}$ ions present in the process water. Also, temperature of the oil sands ore-water slurry has to be above a critical temperature, above which bitumen becomes mobile enough (sufficiently low viscosity) to enfold or become attached to air bubbles. This critical temperature for Athabasca bitumen has been reported by several researchers to be at around 32° C. In summary, liberation of bitumen from the oil sands matrix and attachment of air bubbles to bitumen are essential process steps for bitumen recovery in water slurry-based extraction processes.

Asphaltic acids—which are fractions of bitumen asphaltenes present in bitumen and which contain partly aromatic, oxygen-functional groups such as phenolic, carboxylic, and sulfonic types—become water-soluble, especially when the ore-water slurry's pH (i.e., acidity expressed as the minus logarithm of the hydrogen ion concentration: $pH = -\log [H^+]$) is over 7, and act as surfactants reducing surface and interfacial tensions. The reduction of surface and interfacial tensions in an oil sands ore-water slurry system causes disintegration of the ore structure and resultant liberation of bitumen from the ore. Therefore, the hydrophilic fractions of bitumen asphaltenes in oil sands play an important role in the recovery of bitumen from mined oil sands ore using slurry-based extraction systems.

The water-soluble fraction of bitumen, which acts as a surfactant, can be increased by increasing the pH of the oil sands ore-water slurry by using caustic soda (NaOH); soda ash ($Na_2CO_3$); any salt of weak acid and strong base (hydrolysis of which would be basic); or lime (as CaO or $Ca(OH)_2$), as described in Canadian Patent Application No. 2,581,586 (Ozum) and corresponding U.S. patent application Ser. No. 12/048,430 (which said U.S. application is incorporated herein by reference in its entirety). The water-soluble fraction of bitumen can also be increased by modifying asphaltene molecules contained in bitumen by oxidation, sulfonation, and/or sulfoxidation reactions to water soluble surfactants, which reduce surface and interfacial tensions, as described in International Application No. PCT/CA2005/001875 (Ozum) and corresponding Canadian Patent Application No. 2,629,039 and U.S. patent application Ser. No. 11/720,782 (which said U.S. application is incorporated herein by reference in its entirety).

Recovery of bitumen from deep oil sands formations may be accomplished by well-known thermal methods such as underground bitumen combustion (i.e., in situ combustion, or ISC), or steam injection methods such as steam-assisted gravity drainage (SAGD) and cyclic steam stimulation (CSS). In these methods, the thermal energy injected into deep oil sands formations reduces the bitumen's viscosity and increases its mobility within the reservoir. Steam produced as an ISC by-product, or steam injected into a subsurface oil sands seam, condenses due to thermal energy losses and forms bitumen-water emulsions, which may be recovered by means of production wells. Hydrophilic fractions also help to promote the formation of bitumen-water emulsions under in situ recovery conditions, since they act as surfactants reducing surface and interfacial tensions, thereby helping to break down the oil sands ore structure and promoting the release of bitumen from the ore.

BRIEF SUMMARY OF THE INVENTION

For purposes of this patent document, lipids may be defined in general terms as fatty acids and their derivatives. As used herein, the term "lipids" is to be understood as including not only lipids as defined above, but also lipid derivatives and lipid processing by-products.

The present invention is directed to methods of enhancing separation and production of bitumen from oil sands ore by using lipids or lipid by-products as process aids or additives for oil sands ore-water slurry-based extraction processes and for in situ recovery processes. More specifically, the present invention describes directed to the selective use of lipids, lipid by-products, and lipid derivatives—particularly but not exclusively including biodiesel derived from tall oil fatty acids, preferably methyl esters of tall oil fatty acids—as additives altering bitumen, heavy oils, crude oil, and other hydrocarbons and water phase surface and interfacial tensions, and thereby improving the efficiency of processes involving bitumen recovery in ore-water based slurry extraction and thermal in situ recovery processes (such as but not limited SAGD and CSS processes) and in the production of crude oil and heavy oils using steam or hot water flooding.

Methods in accordance with the present invention may also be adapted for beneficial use in other industrial applications including but not limited to:
  clean-up of soils contaminated with bitumen, oil sands, crude oil, hydrocarbons, and/or their derivatives;
  production of bitumen, heavy oils and/or hydrocarbons-water emulsions for industrial applications; and
  transportation of emulsions (e.g., in pipelines).

The inventors have discovered that the efficiency of separation of bitumen from oil sands can be enhanced by the addition of lipids to oil sands ore. The chemical structures of the lipids, lipid by-products, and lipid derivatives are similar to conventional liquid hydrocarbons with minor differences. Therefore, the use of additives in accordance with the present invention, especially when used in the order of 100 mg of lipid additive per kg of oil sands ore, does not reduce the fuel value of the recovered bitumen to any appreciable degree or at all. Furthermore, the use of lipids, lipid by-products, and lipid derivatives in accordance with the present invention improves bitumen extraction and/or recovery efficiencies without deleteriously affecting the chemistry of the release water (release water being defined for purposes of this patent document as residual water from slurry-based bitumen extraction processes, and alternatively referred to as tailing water with the same meaning).

Beneficial effects may be achieved in accordance with the methods of the present invention by using lipids as process additives in dosages as low as 10 milligrams of lipid additive per kilogram of bitumen. Lipid additive dosages can also be expressed in terms of additive weight per kilogram of oil sands ore, but the correlation between a bitumen-based dosage and an ore-based dosage will depend on the bitumen content of the ore being treated. For example, a dosage of 100 mg of lipids per kg of ore would equate to 800 mg of lipids per kg of bitumen for an oil sands ore containing 12.5% bitumen, but it would equate to 1,250 mg of lipids per kg of bitumen for an oil sands ore containing 8% bitumen.

The lipids can be introduced into slurry-based bitumen recovery processes in a variety of ways, such as by adding lipid additives into:

oil sands ore conditioning vessels;
ore-water slurry transportation pipelines;
any water stream used for ore-water slurry preparation; or
primary, secondary, or other separation vessels for oil sands slurry-based bitumen extraction processes.

For purposes of steam-assisted in situ bitumen recovery processes (e.g., SAGD and CSS), lipid additives can be introduced into subterranean oil sands ore seams by way of, for example, mixing lipids into steam being injected into the ore seams.

In both slurry-based and in situ bitumen extraction process applications, lipids are preferably emulsified with water for optimally effective use as bitumen extraction and/or recovery process aids. The use of lipids in conjunction with in situ bitumen recovery processes or slurry-based bitumen extraction processes for surface-mineable oil sands ores promotes liberation and recovery of bitumen from the oil sands ore matrix. These additives work as surfactants reducing surface and interfacial tensions; therefore, they promote bitumen wetting with water, promote the mobility of bitumen with water in reservoir conditions (e.g., CSS, SAGD, or other steam-assisted thermal in situ recovery processes), and thus result in improved bitumen recovery efficiencies.

Since these additives work as surfactants reducing surface and interfacial tensions, they also improve bitumen recovery efficiency in oil sands ore-water slurry-based extraction processes by reducing the attachment of clay particles to bitumen droplets and promoting the attachment of air bubbles to bitumen droplets. As a result, more bitumen is carried out in the slurry froth, and bitumen recovery efficiency is improved.

The use of lipids in accordance with the present invention does not have harmful or deleterious effects on release water chemistry or the ability to recycle release water to the extraction process. More specifically, the use of lipids as process additives does not increase calcium ($Ca^{2+}$), magnesium ($Mg^{2+}$), and sodium ($Na+$) concentrations in the release water.

The methods of the present invention can be implemented in slurry-based processes over a wide range of temperatures, including but not limited to the range of 25° C. to 90° C. The use of lipids as process aids for bitumen recovery may allow existing oil sands plants to operate their ore-water slurry-based extraction processes at lower temperatures, with reduced thermal energy consumption, reduced carbon dioxide ($CO_2$) emissions, and reduced cost of bitumen production. The methods of the present invention can be readily implemented in existing oil sands plants.

One embodiment of the method of the present invention is directed to the use of tall oil produced by pulp mills using bleached Kraft process (including tall oil by-products, tall oil fractions, and tall oil derivatives) as the source of lipids, lipid by-products, and lipid derivatives as additives in bitumen extraction processes. In another embodiment, the process additive is biodiesel derived from tall oil fatty acids, preferably methyl esters of tall oil fatty acids because of their acceptably low boiling temperatures and chemical stability in the temperature ranges of thermal in situ bitumen and/or hydrocarbon recovery processes such as SAGD and CSS processes. A typical dosage of biodiesel additive would be in the order of 100 mg per kg of bitumen, but beneficial results may be achieved using higher or lower dosages.

In another embodiment, biodiesel derived from tall oil fatty acids, such as their methyl or ethyl esters, is used as a surfactant additive (typically at a dosage in the range of 100 mg/kg bitumen) to reduce interfacial tension between bitumen (and/or other hydrocarbons) and water, thus promoting the stability of bitumen/water (or other hydrocarbon/water) emulsions.

In accordance with the present invention, biodiesel (including but not limited to biodiesel derived from tall oil) may be used as a process aid in the ore-conditioning stage of oil sands ore-water slurry-based bitumen extraction processes without deleteriously affecting the release water chemistry. Biodiesel used at dosages in the order of 100 mg/kg bitumen acts as a surfactant reducing surface and interfacial tensions, promoting the clay dispersion and disintegration of the oil sands ore structure needed for liberation of bitumen from the ore. One of the advantages of using biodiesel as a process aid as taught herein is that it does not harm the chemistry of the release water; for example, it does not cause accumulation of $Na^+$ in the release water, which is one of the major concerns of using NaOH as an ore-conditioning process aid in the conventional Clark's Hot Water Extraction process.

Lipids for use in accordance with the method of the present invention may be selected from the following non-limiting list of lipids, lipid by-products, and lipid derivatives:

the group consisting of monoglycerides, diglycerides, triglycerides, waxes, biodiesel, and tall oil fatty acids;
the group consisting of vegetable oil, animal fats, microbial lipids, by-products of vegetable oil refining, by-products of animal fat refining, cold-pressed oils, raw oils, solvent-extracted vegetable oils, edible oils, hydrogenated oils, used frying oils, margarines, shortenings, lipid-based emulsions, inter-esterified lipid products, and enzyme-modified lipid products;
the group of fatty acids-based chemical compounds consisting of phospholipids, glycolipids, soaps, and similar compounds containing fatty acids as lipophilic part; and
the group of by-products of lipids refining and processing consisting of lipid gums, soap water, soap stock, washing water, acid oil water, waxes, paraffin, deodorizer distillate, free fatty acids, and salts of free fatty acids.

In one alternative embodiment, the method of the present invention comprises the further step of adding lime to the oil sands ore in conjunction with the addition of one or more lipids. Lime for this purpose may be provided in the form of either calcium oxide (CaO) or calcium hydroxide ($Ca(OH)_2$).

Lime may be mixed with oil sands ore at the ore-conditioning stage for slurry-based bitumen recovery processes. For embodiments of the method used in association with thermal in situ bitumen recovery processes, the lime may be introduced into the steam to be injected into oil sands ore seams. Generally speaking, and as indicated in CA 2,581,586 and U.S. patent application Ser. No. 12/048,430, the practical or desirable upper limit of lime dosage will be a function of process water chemistry and oil sands ore characteristics (e.g., bitumen properties, mineral type, fines contents, clay type, etc.). Test results have suggested an optimal dosage of lime in the range of 30 to 200 mg per kg of oil sands ore, and it is to be noted that the lime dosage can be effectively monitored by pH measurement. Although lime dosages outside this optimal range may be used to beneficial effect, lime dosage preferably should not exceed the dosage that would increase the pH of the ore-water slurry to above approximately 9.5.

The addition of lipids, lipid by-products, or lipid derivatives with sufficiently high hydrophobic functionality, in accordance with the present invention, enhances the efficiency of bitumen recovery in primary separation vessels used in slurry-based bitumen extraction processes. As a non-limiting example, addition of the fatty acids fraction of tall oil as an extraction process aid into primary separation vessels at dosages in the order of 100 mg/kg bitumen increases the hydrophobic functionality of the bitumen liberated in the oil sands ore-water conditioning stage. The use of biodiesel produced from tall oil fatty acids or other oils promotes the liberation of bitumen in the oil sands ore-water slurry conditioning stage.

The addition of lipids, lipid by-products, or lipid derivatives with sufficiently high hydrophobic functionality, in accordance with the present invention, also enhances the efficiency of bitumen recovery in secondary separation vessels. The secondary separation vessels, which mostly operate as flotation cells by air injection, are used to recover bitumen from the middling fraction of the primary separation vessels. Therefore, the slurry processed in the secondary separation vessels contains relatively low bitumen concentrations, and the solids contain relatively high amounts of fines (i.e., solids smaller than 45 micron size). The addition of the fatty acids fraction into the secondary separation vessels at dosages in the order of, for example, 100 mg/kg bitumen increases the hydrophobic functionality of the bitumen originally liberated in the oil sands ore-water conditioning stage and a large fraction of which is recovered in the primary separation vessels.

The addition of lipids, lipid by-products, or lipid derivatives with sufficiently high hydrophobic functionality, in accordance with the present invention, also promotes the efficiency of froth treatment processes. Conventional froth treatment processes in the oil sands industry use naphthenic or paraffinic solvents to separate bitumen from the froth produced in the primary separation vessels. Froth composition is typically about 60% bitumen, 30% solids (of which more than 60% is fines), and 10% water. As a non-limiting example, the addition of the fatty acids fraction of tall oil into the froth at a dosage in the order of 100 mg/kg bitumen increases the hydrophobic functionality of the bitumen, thereby causing the bitumen to reject the solids and the water contained in the froth, thus promoting separation of the bitumen from the froth.

Methods in accordance with the present invention may also be used to enhance separation of bitumen from bitumen/water emulsions recovered from thermal in situ recovery processes, such as but not limited to the SAGD and CSS processes. The water/bitumen emulsions produced in these processes are composed of bitumen and/or hydrocarbons and water, with minor amounts of solids. In accordance with one embodiment of the present invention, separation of bitumen from such emulsions is enhanced by mixing the fatty acids fraction derived from tall oil into the emulsion, at dosages in the order of, for example, 100 mg/kg bitumen.

Also in accordance with the present invention, lipids, lipid by-products, or lipid derivatives with sufficiently high hydrophobic functionality may be used to promote the efficiency of the clean-up of soils contaminated with bitumen, hydrocarbons, and/or hydrocarbon derivatives, by the addition of lipids to water-based slurries of such contaminated soils.

BRIEF DESCRIPTION OF THE DRAWINGS

Embodiments of the invention will now be described with reference to the accompanying figures, in which:

FIG. 1 is a table summarizing the compositional properties of oil sands ores used in bitumen extraction tests described herein.

FIG. 2A is a table summarizing bitumen extraction test results for oil sands ores ARC 0807, ARC 0907, and ARC 1107 (per FIG. 1), after treatment with lipid additives in accordance with selected embodiments of the present invention, and in blank tests without lipid additive treatment.

FIG. 2B is a table summarizing bitumen extraction test results for oil sands ore ARC 0108 (per FIG. 1), after treatment with lipid additives in accordance with selected embodiments of the present invention, and in blank tests without lipid additive treatment.

FIG. 3A is a table summarizing results of tailing water chemistry analyses after bitumen extraction from oil sands ores ARC 0807, ARC 0907, and ARC 1107, after lipid additive treatment, and without lipid additive treatment.

FIG. 3B is a table summarizing results of tailing water chemistry analyses after bitumen extraction from ARC 0108 oil sands ore, after lipid additive treatment, and without lipid additive treatment.

FIG. 4 is a table summarizing results of tests measuring recovery of solids in froth from bitumen extraction tests performed on oil sands ore samples ARC 0308 (per FIG. 1), after treatment with tall oil fatty acids and without lipid additive treatment.

DETAILED DESCRIPTION OF THE PREFERRED EMBODIMENTS

Lipids and Lipid By-Products

Fatty acids are composed of from 4 to more than 24 carbon atoms with carboxylic group at one end. Fatty acids are oil-soluble, while carboxylic group, which is acidic, is water-soluble. This property allows fatty acids to act as surfactants. Carboxylic group is a reactive group and it can be esterified with alcohols or other compounds that are also hydrophilic. In that case, these compounds may act as surfactants also. Vegetable oils or animal fats are composed mainly of esters of three fatty acids with glycerol. They are also called triglycerides, triglycerols, or triacylglycerols. Sometimes triglycerides contain carboxylic acids with fewer than four carbon atoms. Therefore, in a wider sense, propionic and acetic acids and their esters can be considered to be lipids. Triglycerides are mostly oil-soluble but are more hydrophilic than bitumen. Used frying oil (e.g., from frying of French fries) is also composed mostly of triglycerides and may contain some surfactants. Lipids are also present in other living things such as fungi, algae, yeast, bacteria, etc.

Vegetable oils and animal fats also contain other compounds such as monoglycerides and diglycerides that are well-known surfactants. Other compounds present in vegetable oils and animal fats, such as phospholipids and glycolipids, are also effective surfactants. Free fatty acids are also present in other compounds that contain chemically-bound fatty acids. Triglycerides or other lipids can be also artificially created from glycerol and fatty acids. Fatty acids esters or other fatty-acid-containing compounds can be chemically synthesized, but would still have similar surface-active properties.

During production and refining of vegetable oils and animal fats, the goals are to extract raw lipids, purify triglycerides, and remove other compounds that are usually less stable. The process typically includes steps that are called degumming, neutralization, deodorization, winterization, etc. During these processes, some of the lipids and lipid by-products can be chemically modified.

"Gum" is a common name for natural surfactants present in lipids. Gum consists mostly of phospholipids, but may also contain free fatty acids, triglycerides, glycolipids, and other compounds. Gum is removed as a by-product and mixed with feed, or further refined into lecithin or similar surfactants. Any of its components, separately or in a mix, will enhance bitumen separation from oil sands.

Free fatty acids can be neutralized with alkali and removed in the form of soap stock or soapy water or washing water. Soaps are salts of fatty acids and act as surfactants. Soap stock is a mix of soaps, triglycerides, free fatty acids, and small amounts of gums and other compounds that may be fatty acid derivatives. All of them act as surfactants and enhance bitumen recovery. Some of the by-products of lipids also include waxes and paraffin.

Triglycerides can be further processed into edible oils, lubricants, margarines, shortenings, etc. Any of these compounds may have somewhat different physical properties, but they would still have similar surface activity when mixed with hydrocarbons. It is known to those skilled in the art of the invention that triglycerides can be hydrolyzed into glycerol and fatty acids. Fatty acids can be esterified with alcohols into biodiesel. These esters contain fatty acids backbone and are also oil-soluble, but are somewhat hydrophilic. Therefore, biodiesel based on fatty acids can be also used in bitumen recovery.

It is known that bitumen and heavy oils may be diluted or transported in the form of emulsion using pipelines, ships, tankers, trucks, etc. Lipids and by-products can act as diluents and surfactants for this purpose. As well, these additives may be used as surfactants or diluents to beneficial effect in soil remediation for cleaning soil polluted with hydrocarbons, especially hydrocarbons such as crude oil (including heavy oil) having lower viscosity than bitumen.

Research and Testing

Laboratory tests were conducted to assess the effectiveness of a variety of lipids as process additives to enhance the efficiency of bitumen recovery from oil sands. Samples of five different oil sand ores for testing purposes, all sourced from oil sands deposits in northern Alberta, were obtained from the Alberta Research Council. FIG. 1 summarizes the approximate composition (weight basis) of these five ores. The values in FIG. 1 for bitumen content were determined by Dean-Stark extraction and gravimetric drying of 5 mL extract on filter paper. Values for sand content were determined based on screening through a 45 μm sieve. Values for "fines in ore" are percentages of fines relative to total ore weight; values for "fines in solids" are percentages of fines relative to total weight of solids in ore.

For each ore/lipid combination tested, bitumen recovery was carried out in a Denver cell for 5 minutes at 800 rpm, typically at a temperature of 40° C. or 50° C. Froth was scooped into a cellulose thimble and extracted with toluene in a Dean-Stark apparatus. Extract was adjusted to 250 mL in a volumetric flask, and 5 mL of extract was spread over a filter paper for overnight drying in a fume hood. The amount of recovered bitumen was determined from the weight difference of the filter. Extraction test results for different ore/lipid combinations are summarized in FIGS. 2A and 2B. Tailing water chemistry was analyzed through measurements of pH, conductivity, alkalinity, and ionic composition; these analytical results are summarized in FIGS. 3A and 3B.

Lipid Materials Tested

Fresh, semi-refined canola oil depleted of gums and free fatty acids was obtained directly from the centrifuges of a canola processing plant in Alberta. Oil gums (rich in lecithin) and soap water were also obtained in the same plant. Soap water (SW) was obtained after neutralization of raw oil and comprised a mix of free fatty acids, sodium soaps, lecithin, and similar surface-active lipid-like materials. Soap water contained approximately 7.5% dry matter.

Biodiesel (BD), which may be defined in general terms as an ester of fatty acids with methanol or ethanol, was obtained from a commercial supplier in Vancouver, B.C. Biodiesel used in the test programs was described as methylated soybean oil with yellow colour, and was fluid at refrigerator temperature (approximately 1° C.).

Monoglycerides were obtained as food-grade material from a commercial supplier in Edmonton, Alberta. This material was actually a mix of monoglycerides and diglycerides, and, more specifically, a white fluffy material in the form of small flakes, with a melting point 56-60° C., with dominant fatty acids being stearic and oleic.

Tall oil fatty acids (TOFA) were obtained from a pulp and paper company. TOFAs were about 97% pure, and consisted mostly of oleic and linoleic acid. TOFAs are fluid at room temperature and become partially crystallized in a refrigerator. TOFAs are produced by fractional distillation from tall oil, which is a by-product of the paper industry (specifically, from the Kraft pulping process).

Preliminary Research

Approximately 4.48 g of canola oil was added to a 300 g sample of ARC 0807 ore; this equates to roughly 10% of the weight of bitumen contained in this high-grade ore. Bitumen extraction was performed at 40° C. Although bitumen recovery was somewhat higher than for blank extraction from ARC 0807 ore, it was actually lower than for blank extraction tests when canola oil, presumably completely extracted with bitumen, was deducted from extraction efficiency. The contact angle between extracted bitumen and process water after 10 minutes of contact time was significantly reduced. Further research into the properties of canola oil revealed that the contact angle between water and glass or water and bitumen or vegetable oil was reduced; i.e., the contact angle between de-ionized (DI) water and glass was approximately 45°, while between DI water and canola-covered glass the contact angle was only about 21°. Nosing angle (i.e., angle between surface and initial area of the droplet) was even lower—about 15°. These results indicated that vegetable oil is in fact more hydrophilic than bitumen.

Bitumen has both hydrophilic and hydrophobic properties, with a contact angle against DI water around 80° to 90° or less (depending on the timing of the first measurement), but the contact angle is much lower against process water—usually less than 60°. The result of these experiments was an indication that canola oil may act as a surfactant with a low HLB number (hydrophilic-lipophilic balance). Froth produced after extraction with canola oil was taller and fluffier. The ARC 0807 ore, although high-grade by bitumen content (i.e., about 14.9%, per FIG. 1), was stiff with low water content, which indicated possible drying on the edge of the pit.

Canola oil is a triglyceride or the ester of three fatty acids and glycerol, which is a very hygroscopic trivalent alcohol. If it can act as a surfactant, then the addition of canola at the rate of 10% based on bitumen (or about 1.5% based on ore) is far too much. It is well known in the food industry to use surfactants at lower levels, usually less than 0.5% (by weight) of the active material (i.e., bitumen in the present case). If used at excessive levels, lipid-based surfactants may have the opposite effect, and may act as demulsifiers and anti-foaming agents.

Recovery of bitumen from high-grade oil sands ores (i.e., ores with comparatively high bitumen content) is usually fairly high in conventional extraction processes. Accordingly, accurate measurement of the beneficial effects of any process additive, although possibly positive, may be more difficult in the case of higher-grade ores. For this reason, experimental research in connection with the present invention focused primarily on lower grade ores (i.e., with bitumen contents of 10% or less), which are usually problematic for the oil sands industry.

Experimental Procedure

Purified canola oil was seen to decrease contact angle, as previously noted, but being a food-grade material it was fairly depleted of other components that are even more potent surfactants, such as free fatty acids, lecithin and similar phospholipids (usually classified as gums), sterols, vitamins, etc. Therefore, further research was directed to using different lipid-like materials as additives at lower amounts to increase recovery of bitumen from low-grade and mid-grade ores.

Process water was either recycled water (obtained from an Alberta oil sands processing plant) or artificial process water (APW) with composition as described in FIG. 3B and made with analytical grade NaCl, KCl, $MgCl_2$, $CaCl_2$, $Na_2SO_4$, and $NaHCO_3$.

Experimental Results

ARC 0907 Ore (FIGS. 2A and 3A)

ARC 0907 ore was a low-grade with significant fines (FIG. 1). The sedimentation of fines was quite good, and tailing water was easy to drain. Average bitumen recovery with addition of canola oil was 75.9%, or 73.8% net bitumen assuming that all added canola was recovered in the froth. Bitumen recovery for blank extraction (i.e., no lipid additive) from ARC 0907 ore was 69.0% and 68.4% on average, which is roughly a 7% difference compared to extraction after canola oil addition. The application of soap water (SW) and lecithin paste gave similar increases.

When canola oil was added and bitumen extracted at 40° C., there was more froth recovered with increased content of both solids and water, while the addition of green paste (oil gum rich in lecithin) and soap water increased solids and water even more. When bitumen extraction was performed at 50° C., compositional differences of froth diminished, but recovery was better when soap water was used, either alone or in the mix with canola oil.

ARC 1107 Ore (FIGS. 2A and 3A)

This ore was also low-grade, with only 8.1% bitumen. The addition of biodiesel (BD) resulted in increased bitumen recovery at dosages of 430 to 3,330 mg per kg ore, but lower dosages of BD gave better results, with bitumen recovery increasing by more than 10%. Tailing water chemistry was not appreciably affected by the addition of BD.

In a further series of experiments, the recovery of bitumen in blank runs (i.e., without lipid treatment) was even lower than the first blank, suggesting possible ore deterioration (such as through oxidation). However, the addition of BD at only 0.12 g per batch or 400 mg per kg ore increased bitumen recovery by 11% when added in combination with CaO, and by 12.9% when used in combination with soap water. Even when the extraction temperature was decreased to 35.5° C., bitumen recovery with BD addition was 4.5% higher than the blank recovery at 40° C.

ARC 0108 Ore (FIGS. 2B and 3B)

This was also a low-grade ore but with different properties. It had much higher fines and salt content, suggesting that it was a marine or estuarine ore. Moreover, its tailings settled similarly to non-segregating tailings (NST); viz., there was no segregation into sand and clay layers. Such an ore may create high slurry viscosity, which inhibits more complete bitumen separation. This ore was treated with BD and TOFA in the first series of experiments.

TOFA treatment initially resulted in a bit more expansion of froth and a greyish colour. During frothing, foam contracted and final volume was much less than for either blank tests or after BD treatment, with foam contraction being proportional to the amount of TOFA. When TOFA was added on the surface of artificial process water (APW), it looked oilier than BD and spread less, which was confirmed by contact angle pictures of BD and TOFA drops "hanging" below the water surface. Froth was sliding more from the generator of the Denver Cell. Air entrapment was less, while froth contained less water and sand. Bitumen concentration in the froth was significantly increased. These results suggest that while the use of TOFA as a process additive may be beneficial in slurry-based bitumen extraction processes, its rejection of water may limit its effectiveness as an additive for purposes of in situ recovery processes.

Treatment of ARC 0108 ore with TOFA at a dosage of 1000 mg per kg ore resulted in less froth richer in bitumen (30.1% average vs. 24.2% in blank), with a smaller percentage of imbibed water. Although the difference in the percentage of solids was marginal, calculation of average weights indicated much lower content of solids and water in froth—4.75 g and about 13.1 g, respectively. Lower dosages of TOFA resulted in lower rejection of water and solids. In contrast, the addition of BD resulted in entrapment of 1.4 g of solids and roughly 3 g of water more than in blank tests. This demonstrates that the addition of fatty acids to oil sands ore makes bitumen and the froth from extraction more hydrophobic, while the use of esters such as biodiesel, which are more hydrophilic than TOFA, traps more water and sand in the froth.

These findings suggest new possibilities in the use of forestry by-products in the recovery of bitumen. For example, while biodiesel (whether produced from vegetable oils, esterification of TOFA, or in any other way) may make bitumen more water wet and "soften" it to enhance in situ recovery, TOFA may have an application as a froth improver through rejection of water and sands, creation of more concentrated bitumen froth, and increased plant capacity and savings through reduced consumption of diluent (naphtha).

In the second series of experiments with ARC 0108 ore, the addition of monoglycerides (MG) alone or in the combination with BD was tested. It was observed that effective dosages were much smaller for monoglyceride addition than for BD. When MGs were added at a dosage of 90 mg, there was no froth and the slurry looked completely emulsified. When the dosage was 9 mg or 18 mg (30 and 60 ppm, respectively), froth was recovered but with less bitumen. Extraction with BD, alone or in combination with MG or soap water (SW), was better than blank extraction.

When MGs were added straight to the process water, they behaved similar to dish detergent, with significant movement of oil on the water surface, although MG was solid flakes at the process temperature (i.e., MG melting point is in the range of 56° to 60° C.).

The addition of soap water (SW) did not increase bitumen recovery more than BD alone. Sulphate was decreased when SW was added, as was the pH of the tailing water.

ARC 0308 Ore (FIG. 4)

This was a low-grade ore with fines even higher than ARC 0108, but clay would not settle even after two weeks of standing. Such ore is usually blended with better ores if processed at all.

A higher dosage of BD (about 830 mg per kg ore) at 50° C. increased bitumen recovery.

The addition of TOFA in combination with CaO also increased recovery similar to BD addition, but its behaviour was very consistent. Similar to earlier runs, the amount of froth was decreased with the rejection of both solids and water; i.e., when solids were washed out from froth extraction it was found that the froth contained a higher percentage of sand and a lower percentage of fines than ore. Furthermore, froth treated with 500 mg per kg ore of TOFA contained about 8 g of solids less with an even lower percentage of fines. This animosity of TOFA versus fines suggests a beneficial industrial application for TOFA as a froth improvement additive.

Summary and Conclusions from Experimental Testing

The testing program conducted in connection with the present invention indicated that, as a general proposition, the effect of lipid addition on the efficiency of recovery of bitumen from oil sands ore is variable depending on the particular chemical structure of the lipid being used. More specific observations were as follows:

Treatment of oil sands ore with vegetable oil (specifically canola oil) increased bitumen recovery and the amount of froth, mostly due to the coalescence of bitumen droplets. Its use is simple and the need for refining after canola pressing or hexane extraction is minimal, much less than for edible oil or further processing into biodiesel. Tailing water quality was largely unaffected when canola oil was used as an additive.

Treatment with biodiesel (BD) increased bitumen recovery in some cases for ores with increased level of fines. A trend similar to that for canola oil treatment was observed for BD treatment, with increases in all three areas: froth, bitumen, and solids recovery. BD treatment can be used for surface-mined oil sands ore, or even for in situ bitumen recovery, alone or in the mix with other compounds such as monoglycerides. Tailing water quality was largely unaffected when biodiesel was used as an additive.

Treatment with tall oil fatty acids (TOFA) had a somewhat different effect. The amount of froth was decreased, due to the rejection of both water and solids, but bitumen recovery was improved in ores with well-settling tailings. Test results suggested that TOFA may be particularly useful as a froth improver, but it may also have beneficial effects as a primary process additive (e.g., in a mixture with BD) in conditioning vessels for surface-mined oil sands ores.

Monoglycerides (MGs) are excellent emulsifiers for bitumen. When added at a dosage of 300 mg per kg ore, MGs were observed to completely destroy foam and prevent separation of bitumen. This suggests the beneficial use of MGs as an additive to enhance the transportability of bitumen and/or in the production of emulsions for power plants. Although MGs were seen to imbibe a significant amount of water at dosages as low as 60 mg per kg ore, it remains possible that MGs may be beneficially used as a process additive for in situ oil or bitumen recovery, either alone or mixed with other lipids.

Preferred Embodiments

In one embodiment of the method of the present invention, lipids are used as process additives to enhance the efficiency of bitumen recovery from excavated oil sands ore in slurry-based extraction processes. The lipids may be added at the ore-conditioning stage, prior to slurrification of the ore. Alternatively, the lipids may be added to the oil sands ore/water slurry, such as in a primary or secondary separation vessel or in a slurry pipeline.

In an alternative embodiment of the method, lipids are used as process additives for thermal in situ processes for recovering bitumen from subterranean oil sands ore bodies or ore seams—for example, steam injection methods such as steam-assisted gravity drainage (SAGD) and cyclic steam stimulation (CSS), which involve injection of steam into oil sands formations. Heat from the injected steam reduces the viscosity of the bitumen in situ and promotes the creation of bitumen-water emulsions which may then be recovered via production wells. Lipid addition in conjunction with such in situ processes may be implemented by metering a flow of selected lipids into the steam prior to injection into the oil sands formation, such as at a steam-generating facility or directly into a steam injection well. Persons skilled in the art of the invention will appreciate that other means of introducing lipids into oil sands ore in situ may be devised in accordance with known technologies without departing from the scope of the present invention.

Dosages of lipids in accordance with the method of the invention may be as low as 5 milligrams of lipid per kilogram of bitumen in the ore being treated. In particularly preferred embodiments of the method, the lipid dosage will be in the range of 100 mg per kg bitumen. However, higher lipid dosages may also be used to beneficial effect. Determination of appropriate lipid dosages on an ore weight basis (i.e., lipid dosage per unit weight of oil sands ore, rather than on a bitumen weight basis) will depend on the bitumen content of the particular oil sands ore being treated.

The method of the invention may also be readily adapted for other practical applications. In one alternative embodiment, lipids are added to oil sands ore-water slurry to enhance properties of the slurry froth. In another embodiment, lipids are used as process additives to facilitate or enhance production of bitumen-water or oil-water emulsions. In other embodiments, lipids are used as process additives to facilitate separation of bitumen or oil from such emulsions, or to enhance the stability and transportability of emulsions, such as in pipelines. In a yet further embodiment of the method, lipids are used to facilitate separation of bitumen, oil, or other hydrocarbons from contaminated soil, preferably by mixing lipids in appropriate dosages into a soil-water slurry.

It will be readily appreciated by those skilled in the art that various modifications of the present invention may be devised without departing from the essential concept of the invention, and all such modifications are intended to come within the scope of the present invention and the claims appended hereto. It is to be especially understood that the invention is not intended to be limited to illustrated or described embodiments, and that the substitution of a variant of a claimed element, step, or feature, without any substantial resultant change in the working of the invention, will not constitute a departure from the scope of the invention.

In this patent document, the word "comprising" is used in its non-limiting sense to mean that items following that word are included, but items not specifically mentioned are not excluded. A reference to an element by the indefinite article "a" does not exclude the possibility that more than one of the element is present, unless the context clearly requires that there be one and only one such element.

What is claimed is:

1. A method for enhancing recovery of bitumen from oil sands in conjunction with a steam-assisted in situ bitumen recovery process, said method comprising the step of introducing a surfactant consisting of biodiesel into oil sands ore in situ, at a dosage in the range between approximately 50 milligrams and approximately 2,000 milligrams of surfactant per kilogram of bitumen in the ore, wherein the introduction of the surfactant into the oil sands ore is effected by mixing the surfactant into steam being injected into the ore for purposes of the steam-assisted in situ bitumen recovery process.

2. The method of claim 1, further comprising the step of adding lime to the oil sands ore in conjunction with the introduction of surfactant, said lime being in a form selected from the group consisting of calcium oxide and calcium hydroxide.

3. The method of claim 2 wherein lime is added to the oil sands ore at a dosage between approximately 30 milligrams of lime per kilogram of oil sands ore and 200 milligrams of lime per kilogram of oil sands ore.

4. The method of claim 1 wherein the dosage of surfactant is approximately 100 milligrams of surfactant per kilogram of bitumen in the ore.

5. The method of claim 1 wherein the biodiesel comprises esters of tall oil fatty acids.

6. The method of claim 5 wherein the biodiesel is a product of esterification of tall oil fatty acids with alcohol.

7. The method of claim 1 wherein the biodiesel comprises methyl esters of tall oil fatty acids.

8. The method of claim 1 wherein the biodiesel comprises esters of canola oil fatty acids.

9. The method of claim 1 wherein the biodiesel comprises methylated soybean oil.

10. The method of claim 1 wherein the biodiesel is derived from tall oil fatty acids.

11. The method of claim 1 wherein the steam-assisted in situ bitumen recovery process is a steam-assisted gravity drainage (SAGD) process.

12. The method of claim 1 wherein the steam-assisted in situ bitumen recovery process is a cyclic steam stimulation (CSS) process.

* * * * *